(12) United States Patent
Lemancik et al.

(10) Patent No.: US 7,812,467 B1
(45) Date of Patent: Oct. 12, 2010

(54) SMART ALTERNATOR LOAD CONTROL

(75) Inventors: Michael J. Lemancik, Oshkosh, WI (US); Randy K. Novak, Oshkosh, WI (US)

(73) Assignee: Woodward Governor Company, Fort Collins, CO (US)

( * ) Notice: Subject to any disclaimer, the term of this patent is extended or adjusted under 35 U.S.C. 154(b) by 634 days.

(21) Appl. No.: 11/774,656

(22) Filed: Jul. 9, 2007

(51) Int. Cl.
*F02D 29/06* (2006.01)
*H02P 90/04* (2006.01)

(52) U.S. Cl. .................................. 290/40 C; 290/40 R

(58) Field of Classification Search ............... 290/40 C, 290/40 A, 40 B, 40 F, 40 R; 123/406.24; 701/110
See application file for complete search history.

(56) References Cited

U.S. PATENT DOCUMENTS

| | | | | |
|---|---|---|---|---|
| 5,570,001 A | * | 10/1996 | Fenley | 322/36 |
| 6,657,416 B2 | * | 12/2003 | Kern et al. | 322/29 |
| 7,009,365 B1 | * | 3/2006 | Namuduri et al. | 322/23 |
| 7,170,262 B2 | * | 1/2007 | Pettigrew | 322/32 |
| 2006/0152198 A1 | * | 7/2006 | Winnie et al. | 322/29 |
| 2007/0228735 A1 | * | 10/2007 | Becker | 290/40 C |

* cited by examiner

*Primary Examiner*—Julio Cesar Gonzalez
(74) *Attorney, Agent, or Firm*—Reinhart Boerner Van Deuren P.C.

(57) ABSTRACT

A smart alternator control circuit and method is provided limiting alternator load on an internal combustion engine.

17 Claims, 3 Drawing Sheets

SMART ALTERNATOR LOAD CONTROL

BACKGROUND AND SUMMARY

The invention relates to alternators for internal combustion engines, and more particularly to alternator load control.

The invention arose during continuing development efforts directed toward marine internal combustion engines. Because electrical demand is so high on today's boats, marine engines have been equipped with higher capacity alternators. The higher capacity alternators are typically capable of supplying approximately 50% of their full rated current at engine idle speed. For example, with a 70 amp alternator that is 50% efficient, it is not unusual for two horsepower to be consumed by the alternator when heavy electrical loads are placed on the system. A consequent drop in engine RPM is noticed by the operator at low speeds. In extreme cases, the load is substantial enough that the engine stalls. Alternator control circuitry operates independently of engine capability. The alternator will produce as much current as it can, given the rotational speed of the rotor, driven by the engine, without regard for the mechanical load being placed on the running engine.

The present invention provides a simple and effective solution, including smart alternator control.

DETAILED DESCRIPTION

Figure 1:
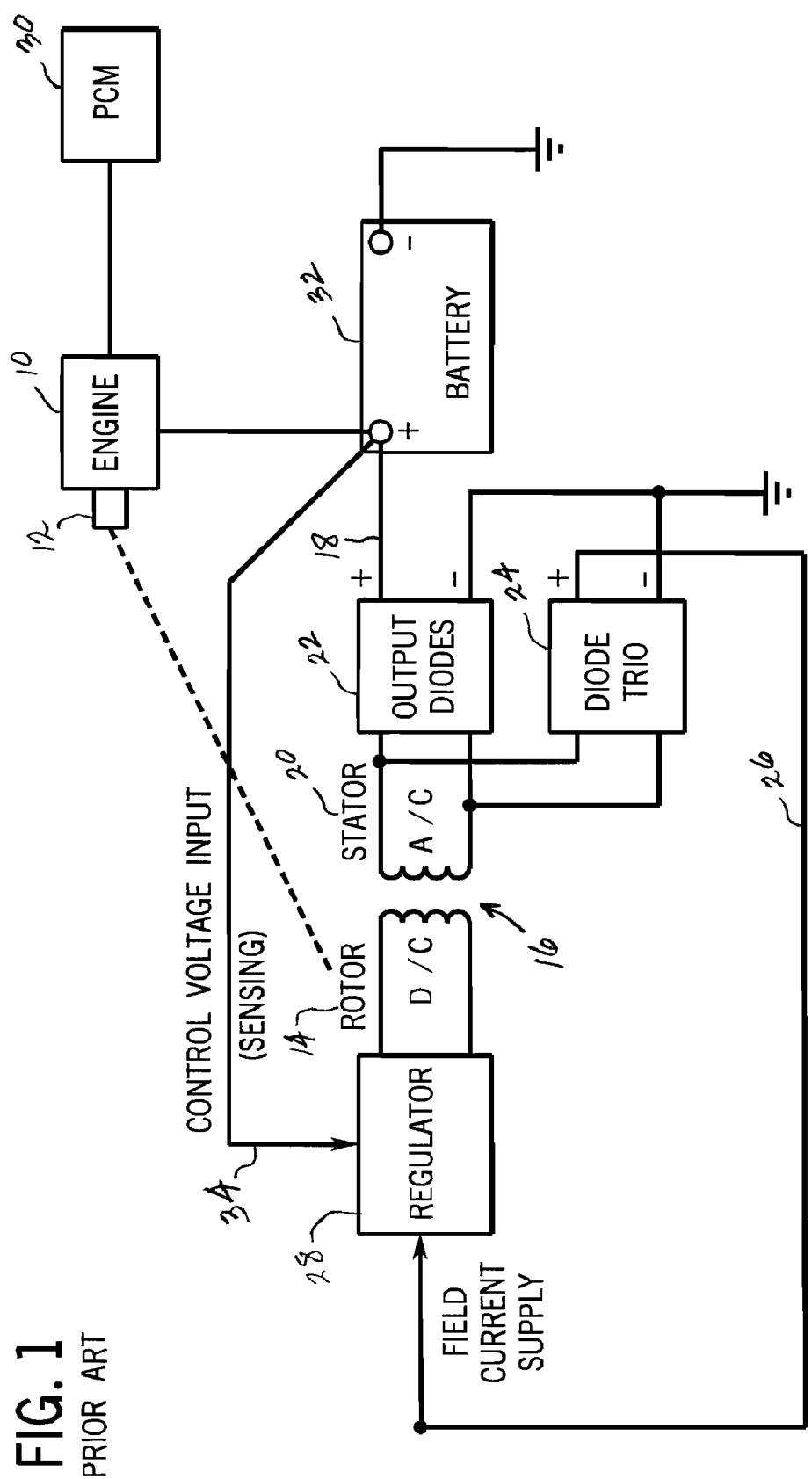
FIG. 1 is a schematic circuit diagram showing alternator control as known in the prior art.

FIG. 1 shows an internal combustion engine 10 having an output shaft 12, e.g. a crankshaft, driving the rotor 14 of an alternator 16, e.g. by a pulley belt, to generate electrical energy at the alternator output 18 for use by the engine. As known, the alternator typically has a stator 20 supplying output power through output diodes 22 and supplying field current through diode trio 24, which field current is supplied on feedback line 26 to supply field current for the alternator as input to regulator 28 and enabling generation of electrical energy upon rotation of rotor 14 as driven by output shaft 12 of engine 10. The alternator causes a load on the engine which may reduce engine speed or even stall the engine, particularly at idle or low engine speed, as above noted. The engine has a propulsion control module 30 monitoring designated engine operational parameters such as engine speed and load, and controlling designated variables such as fuel, air, spark, to control operation of the engine, all as is known. The engine has a battery 32 supplying electrical power for the engine, which battery is charged by the output of the alternator. The alternator has a control voltage sensing input line 34 from the battery providing a set point for the alternator output, all as is known.

Figure 2:
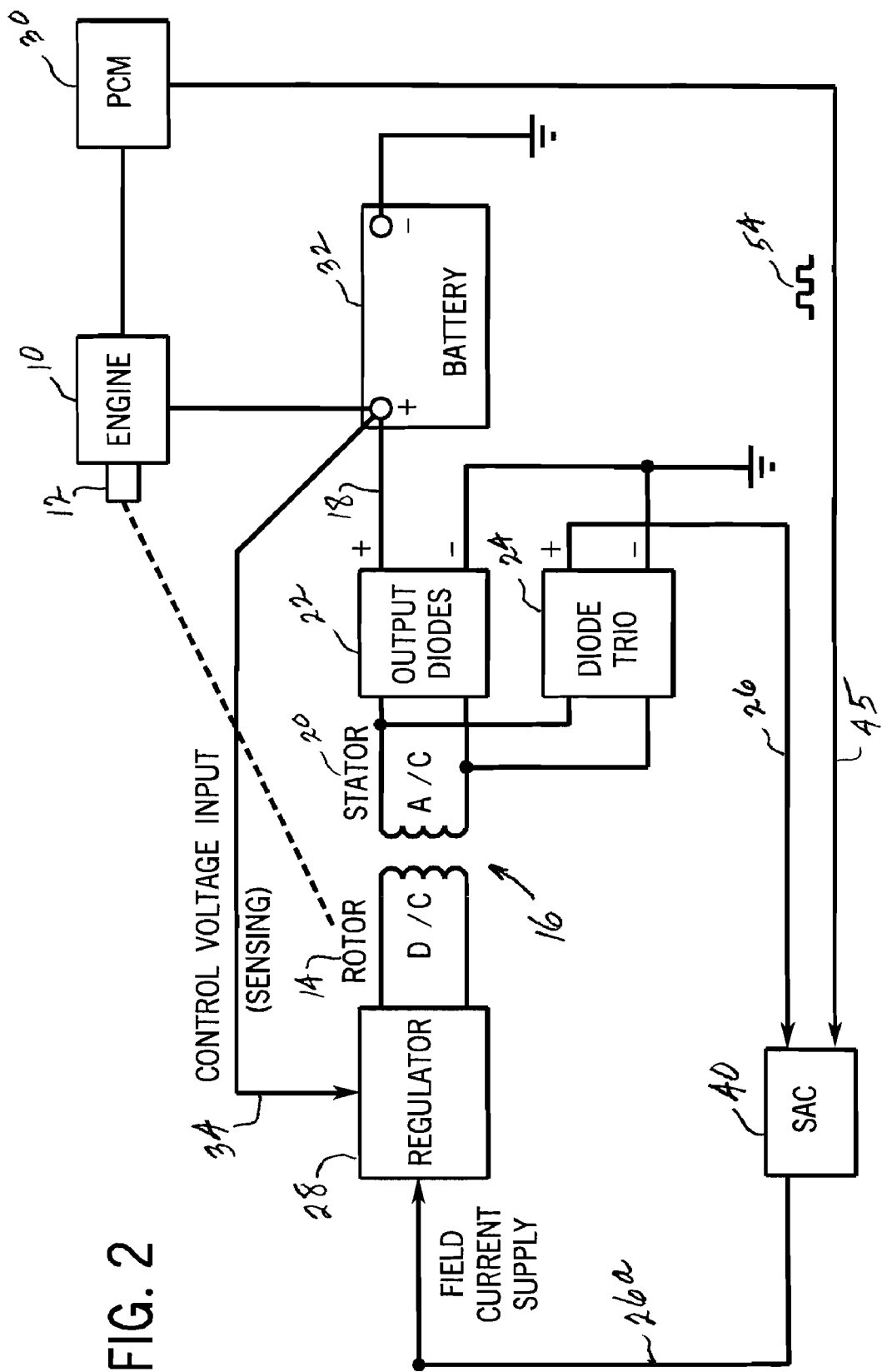
FIG. 2 is like FIG. 1 and shows smart alternator control in accordance with the present invention.
Figures 3, 4:
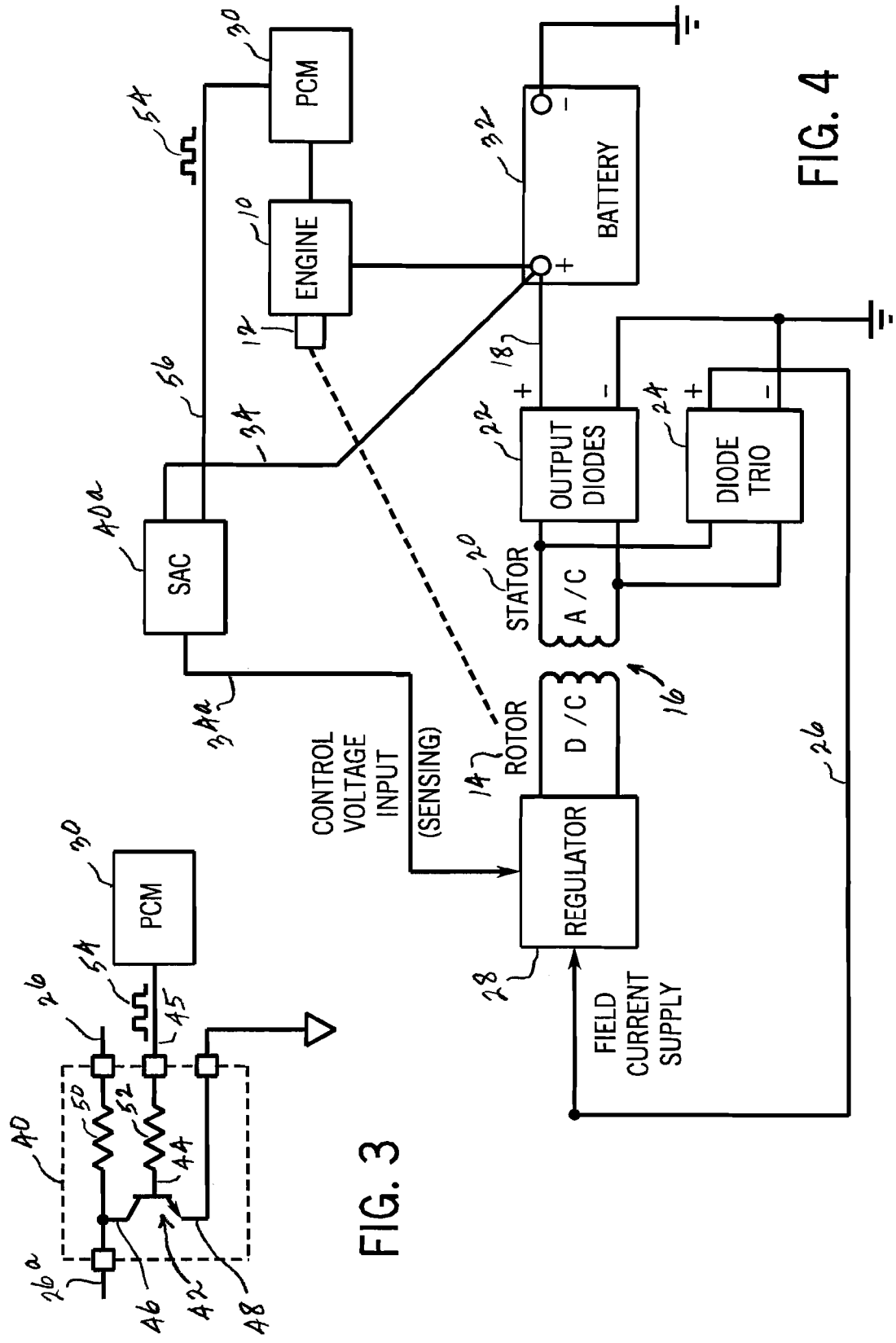
FIG. 3 is a circuit diagram of a portion of FIG. 2.
FIG. 4 is like FIG. 2 and shows an alternate embodiment.

FIGS. 2-4 use like reference numerals from above where appropriate to facilitate understanding. A smart alternator control (SAC) circuit 40 is responsive to control module 30 and limits alternator load on engine 10, to prevent stalling of the engine. Smart alternator control circuit 40 limits alternator load on engine 10 by limiting electrical output of the alternator to in turn limit the load imposed by rotor 14 on output shaft 12 of the engine. The difference between the limited electrical output of the alternator and the noted high electrical demand is supplied by battery 32 until control module 30 determines that engine 10 has sufficient extra available horsepower to charge battery 32 from the alternator, whereupon smart alternator control circuit 40 permits the alternator to generate extra electrical output, above the noted limited electrical output, to charge battery 32.

In the preferred embodiment, smart alternator control circuit 40 limits alternator output by altering the field current at 26 responsive to control module 30. Smart alternator control circuit 40 increasingly shunts field current from 26 away from the alternator in response to a given load-induced engine speed-reduction condition as monitored by control module 30, resulting in reduced field current at 26a, FIG. 3, supplied to the alternator. Smart alternator control circuit 40 includes a variable conduction shunt element 42, FIG. 3, connected to feedback line 26 and having a control terminal 44 connected to control module 30 at line 45 and controlling conduction of variable conduction shunt element 42 in response thereto. In one embodiment, variable conduction shunt element 42 is a bipolar transistor having its collector 46 connected to feedback line 26, its base 44 connected to control module 30, and its emitter 48 connected to ground. Current limiting resistors 50 and 52 are provided in the collector and base circuits, respectively, as shown. In the preferred embodiment, a pulse width modulated (PWM) signal 54 is provided from control module 30, comparable to PWM signals provided from module 30 to engine 10. Accordingly, variable conduction element 42 has a variable duty cycle controlled by PWM signal 54 to in turn control alternator output. Smart alternator control circuit 40 increasingly shunts field current away from the alternator in response to the noted condition as monitored by control module 30, wherein the duty cycle of conduction of variable conduction shunt element 42 as controlled by PWM signal 54 is increased at the noted load-induced engine speed-reduction condition.

In an alternate embodiment, the smart alternator control circuit 40 instead alters the noted set point responsive to control module 30, as shown at 40a in FIG. 4. The variable conduction shunt element such as 42 of the smart alternator control circuit is connected to the control voltage sensing input line 34 and has a control terminal such as 44 connected to the control module at line 56 and controlling conduction of the variable conduction shunt element in response thereto, to provide an altered control voltage input at 34a, to provide the noted limited alternator electrical output.

The present system provides a method for controlling an alternator 16 of an internal combustion engine 10 having an output shaft 12 driving the rotor 14 of the alternator to generate electrical energy at the alternator output 18 for use by the engine. The alternator causes a load on the engine which may reduce engine speed or even stall the engine particularly at idle or low engine speed. The method includes providing a smart alternator control circuit 40, 40a and responding to the control module 30 and limiting alternator load on the engine at the noted load-induced engine speed-reduction condition and preventing stalling of the engine. The method includes limiting alternator load on the engine by limiting electrical output of the alternator to in turn limit the load imposed by the rotor on the output shaft 12 of the engine, and supplying with battery 32 the difference between the limited electrical output of the alternator and the noted high electrical demand until control module 30 determines that the engine has sufficient extra available horsepower to charge the battery from the alternator, and then permitting the alternator to generate extra electrical output, above the noted limited electrical output, to charge the battery 32. The method includes altering the field current at 26 with the smart alternator control circuit 40 responsive to control module 30. The method includes increasingly shunting field current away from the alternator with the smart alternator control circuit in response to the noted load-induced engine speed-reduction condition as monitored by the control module. The method includes providing the smart alternator control circuit as a variable conduction shunt element connected to feedback line 26 and having a control terminal 44 connected to control module 30, and controlling conduction of variable conduction shunt element 42 in response to control module 30. In an alternate embodiment, the method includes altering the alternator set point with a smart alternator control circuit 40a responsive to control module 30. The method further includes controlling conduction of the variable conduction shunt element 42 at a variable duty cycle controlled by a PWM signal 54 to control alternator output.

The method includes controlling the duty cycle of conduction of the variable conduction shunt element by PWM signal 54 to increase the duty cycle of conduction at the noted condition.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems, and method steps described herein may be used alone or in combination with other configurations, systems and method steps. It is expected that various equivalents, alternatives and modifications are possible within the scope of the appended claims.

What is claimed is:

1. In an internal combustion engine having an output shaft driving the rotor of an alternator to generate electrical energy at an alternator output for use by said engine, said alternator causing a load on said engine which may reduce engine speed or even stall said engine, said engine also having a control module monitoring designated engine operational parameters such as engine speed and load and controlling designated variables such as fuel, air, spark, to control operation of said engine, the improvement comprising a smart alternator control circuit responsive to said control module and limiting alternator load on said engine at a given load-induced engine speed-reduction condition and preventing stalling of said engine, and wherein said engine has a battery, and said smart alternator control circuit limits alternator load on said engine by limiting electrical output of said alternator to in turn limit the load imposed by said rotor on said output shaft of said engine, and wherein the difference between the limited electrical output of said alternator and said high electrical demand is supplied by said battery until said control module determines that said engine has sufficient extra available horsepower to charge said battery from said alternator, whereupon said smart alternator control circuit permits said alternator to generate extra electrical output, above said limited electrical output, to charge said battery.

2. The improvement according to claim 1 wherein said alternator output also supplies field current for said alternator enabling generation of said electrical energy upon rotation of said rotor as driven by said output shaft of said engine, and wherein said smart alternator control circuit alters said field current responsive to said control module.

3. The improvement according to claim 2 wherein said smart alternator control circuit increasingly shunts field current away from said alternator in response to said given condition as monitored by said control module.

4. The improvement according to claim 3 wherein said field current is supplied on a feedback line from said alternator output, and said smart alternator control circuit comprises a variable conduction shunt element connected to said feedback line and having a control terminal connected to said control module and controlling conduction of said variable conduction shunt element in response thereto.

5. The improvement according to claim 4 wherein said variable conduction shunt element comprises a bipolar transistor having one of its emitter and collector connected to said feedback line, and having its base connected to said control module.

6. The improvement according to claim 1 wherein said alternator has a control voltage sensing input line from said battery providing a set point for said alternator output, and wherein said smart alternator control circuit alters said set point responsive to said control module.

7. The improvement according to claim 6 wherein said smart alternator control circuit comprises a variable conduction shunt element connected to said control voltage sensing input line and having a control terminal connected to said control module and controlling conduction of said variable conduction shunt element in response thereto.

8. The improvement according to claim 1 wherein said smart alternator control circuit comprises a variable conduction element receiving a pulse width modulated, PWM, signal from said control module and having a variable duty cycle controlled by said PWM signal to control said alternator output.

9. The improvement according to claim 8 wherein said engine has a battery, and said smart alternator control circuit limits alternator load on said engine by limiting electrical output of said alternator to in turn limit the load imposed by said rotor on said output shaft of said engine, and wherein the difference between the limited electrical output of said alternator and said high electrical demand is supplied by said battery until said control module determines that said engine has sufficient extra available horsepower to charge said battery from said alternator, whereupon said smart alternator control circuit permits said alternator to generate extra electrical output, above said limited electrical output, to charge said battery, wherein said alternator output also supplies field current for said alternator enabling generation of said electrical energy upon rotation of said rotor as driven by said output shaft of said engine, and wherein said smart alternator control circuit alters said field current responsive to said control module, wherein said smart alternator control circuit increasingly shunts field current away from said alternator in response to said given condition as monitored by said control module, wherein said field current is supplied on a feedback line from said alternator output, and said smart alternator control circuit comprises a variable conduction shunt element connected to said feedback line and having a control terminal connected to said control module and controlling conduction of said variable conduction shunt element in response thereto and wherein the duty cycle of conduction of said variable conduction shunt element as controlled by said PWM signal is increased at said given condition.

10. A method for controlling an alternator of an internal combustion engine having an output shaft driving the rotor of the alternator to generate electrical energy at an alternator output for use by said engine, said alternator causing a load on said engine which may reduce engine speed or even stall said engine, said engine also having a control module monitoring designated operational parameters such as engine speed and load, and controlling designated variables such as fuel, air, spark, to control operation of said engine, said method comprising providing a smart alternator control circuit and responding to said control module and limiting alternator load on said engine at a given load-induced engine speed-reduction condition and preventing stalling of said engine, and wherein said engine has a battery, and comprising limiting alternator load on said engine by limiting electrical output of said alternator to in turn limit the load imposed by said rotor on said output shaft of said engine, and supplying with said battery the difference between the limited electrical output of said alternator and said high electrical demand until said control module determines that said engine has sufficient extra available horsepower to charge said battery from said alternator, and then permitting said alternator to generate extra electrical output, above said limited electrical output, to charge said battery.

11. The method according to claim 10 wherein said alternator output also supplies field current for said alternator enabling generation of said electrical energy upon rotation of said rotor as driven by said output shaft of said engine, and comprising altering said field current with said smart alternator control circuit responsive to said control module.

12. The method according to claim 11 comprising increasingly shunting field current away from said alternator with said smart alternator control circuit in response to said given stall condition as monitored by said control module.

13. The method according to claim 12 wherein said field current is supplied on a feedback line from said alternator output, and comprising providing said smart alternator control circuit as a variable conduction shunt element connected to said feedback line and having a control terminal connected to said control module, and controlling conduction of said variable conduction shunt element in response to said control module.

14. The method according to claim 10 wherein said alternator has a control voltage sensing input line from said battery providing a set point for said alternator output, and comprising altering said set point with said smart alternator control circuit responsive to said control module.

15. The method according to claim 14 comprising providing said smart alternator control circuit as a variable conduction shunt element connected to said control voltage input line and having a control terminal connected to said control module, and controlling conduction of said variable conduction shunt element in response to said control module.

16. The method according to claim 10 comprising providing said smart alternator control circuit as a variable conduction element receiving a pulse width modulated, PWM, signal from said control module, and controlling conduction of said variable conduction element at a variable duty cycle controlled by said PWM signal to control said alternator output.

17. The method according to claim 16 wherein said engine has a battery, and comprising limiting alternator load on said engine by limiting electrical output of said alternator to in turn limit the load imposed by said rotor on said output shaft of said engine, and supplying with said battery the difference between the limited electrical output of said alternator and said high electrical demand until said control module determines that said engine has sufficient extra available horsepower to charge said battery from said alternator, and then permitting said alternator to generate extra electrical output, above said limited electrical output, to charge said battery, wherein said alternator output also supplies field current for said alternator enabling generation of said electrical energy upon rotation of said rotor as driven by said output shaft of said engine, and comprising altering said field current with said smart alternator control circuit responsive to said control module, comprising increasingly shunting field current away from said alternator with said smart alternator control circuit in response to said given condition as monitored by said control module, wherein said field current is supplied on a feedback line from said alternator output, and comprising providing said smart alternator control circuit as a variable conduction shunt element connected to said feedback line and having a control terminal connected to said control module, and controlling conduction of said variable conduction shunt element in response to said control module, and comprising controlling the duty cycle of conduction of said variable conduction shunt element by said PWM signal to increase said duty cycle of conduction at said given condition.

* * * * *